(12) United States Patent
Kao et al.

(10) Patent No.: US 7,673,234 B2
(45) Date of Patent: Mar. 2, 2010

(54) KNOWLEDGE MANAGEMENT USING TEXT CLASSIFICATION

(75) Inventors: Anne S. W. Kao, Bellevue, WA (US); Stephen R. Poteet, Bellevue, WA (US); Lesley Hong-Minh Quach, Seattle, WA (US); Steven D. Woods, Seattle, WA (US)

(73) Assignee: The Boeing Company, Chicago, IL (US)

( * ) Notice: Subject to any disclaimer, the term of this patent is extended or adjusted under 35 U.S.C. 154(b) by 845 days.

(21) Appl. No.: 10/095,673

(22) Filed: Mar. 11, 2002

(65) Prior Publication Data

US 2003/0172357 A1    Sep. 11, 2003

(51) Int. Cl.
    *G06F 17/00*    (2006.01)
(52) U.S. Cl. ..................... 715/255; 715/256
(58) Field of Classification Search ............... 715/529, 715/255, 256
    See application file for complete search history.

(56) References Cited

U.S. PATENT DOCUMENTS

| 6,137,911 | A * | 10/2000 | Zhilyaev ............... 382/225 |
| 6,236,768 | B1 | 5/2001 | Rhodes et al. |
| 6,256,630 | B1 | 7/2001 | Gilai et al. |
| 6,263,335 | B1 | 7/2001 | Paik et al. |
| 6,263,341 | B1 | 7/2001 | Smiley |
| 6,263,342 | B1 | 7/2001 | Chang et al. |
| 6,266,664 | B1 | 7/2001 | Russell-Falla et al. |
| 6,272,488 | B1 | 8/2001 | Chang et al. |
| 6,272,495 | B1 | 8/2001 | Hetherington |
| 6,272,507 | B1 | 8/2001 | Pirolli et al. |
| 6,553,365 | B1 * | 4/2003 | Summerlin et al. ............ 707/2 |
| 6,665,681 | B1 * | 12/2003 | Vogel ........................ 707/101 |
| 6,675,159 | B1 * | 1/2004 | Lin et al. ....................... 707/3 |
| 6,711,585 | B1 * | 3/2004 | Copperman et al. ...... 707/104.1 |
| 6,847,972 | B1 * | 1/2005 | Vernau et al. ............... 707/101 |
| 2001/0016846 | A1 * | 8/2001 | Chakrabarti et al. ........ 707/102 |
| 2001/0037324 | A1 | 11/2001 | Agrawal et al. |
| 2003/0130993 | A1 * | 7/2003 | Mendelevitch et al. ......... 707/3 |

FOREIGN PATENT DOCUMENTS

WO    WO 02/10980 A1    2/2002

OTHER PUBLICATIONS

Liu, et al., "Building semantic perception net for topic spotting," ACL '01, published Jul. 2001, p. 378-385.*

(Continued)

*Primary Examiner*—Amelia Rutledge
(74) *Attorney, Agent, or Firm*—Toler Law Group

(57) ABSTRACT

A method and system are provided for determining metadata to be assigned to a document. A document is identified to be published to a collection of documents. A category for publishing the document to the collection is automatically recommended using a text classifier. At least one category for the document may be selected, and the selected category is assigned as metadata for the document. A method and system are also provided for constructing a search for a document in a collection of documents. A search query is entered for a document in a collection of documents. A search category for searching for the document in the collection of documents is automatically recommended using a text classifier. At least one search category for searching for the document is selected.

42 Claims, 17 Drawing Sheets

OTHER PUBLICATIONS

Chen, et al., "Hierarchical classification of Web content", SIGIR '00: Proceedings of the 23rd annual international ACM SIGIR conference on Research and development in information retrieval; published Jul. 2000, p. 256-263.*

Chen, et al., "Bringing order to the Web: automatically categorizing search results", CHI '00: Proceedings of the SIGCHI conference on Human factors in computing systems, published Apr. 2000, p. 145-152.*

Chakrabarti, et al., "Scalable feature selection, classification and signature generation for organizing large text databases into hierarchical topic taxonomies", The VLDB Journal—The International Journal on Very Large Data Bases, vol. 7 Issue 3; published Aug. 1998, p. 163-178.*

* cited by examiner

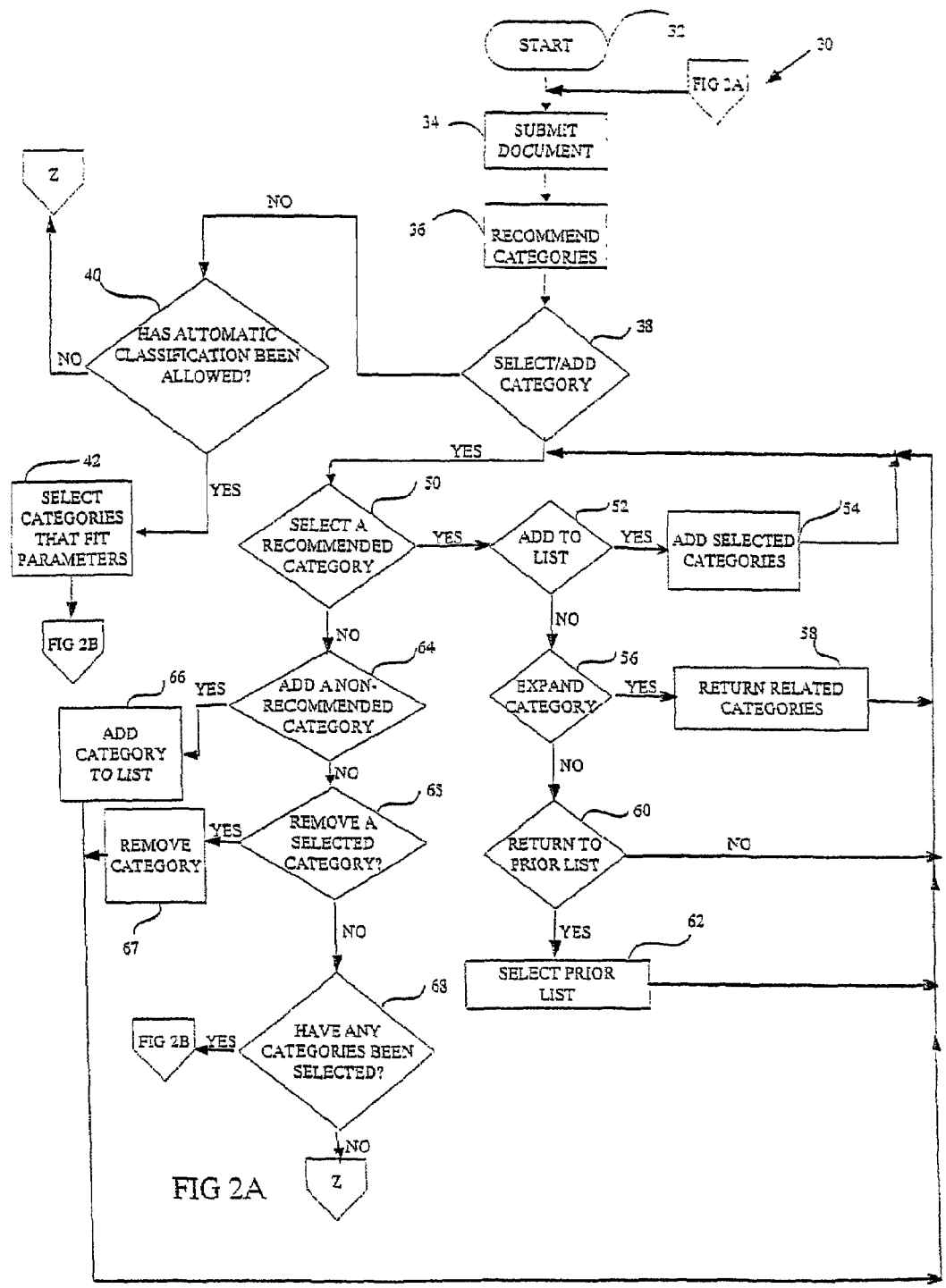

KNOWLEDGE MANAGEMENT USING TEXT CLASSIFICATION

FIELD OF THE INVENTION

This invention relates generally to knowledge management and, more specifically, to a method and system for managing knowledge using text classification.

BACKGROUND OF THE INVENTION

An important component of knowledge management is organization of documents of all kinds for quick and easy access by all authorized members of a company or organization. A useful and effective way of accomplishing this is to associate one or more categories, chosen from a fixed set of organization-specific knowledge categories, to each document for subsequent use in searching or browsing. Specific categories will vary from organization to organization, but categories may number in the hundreds, thousands, or even tens of thousands for a large, technical company.

A problem is presented, however, regarding how an author or manager of a document can determine all knowledge categories that are appropriate for the document. Although the author may be familiar with knowledge categories used regularly by the author, there are likely many other categories that are appropriate for the document and that would be used by searchers for whom this document would be useful. It would not be feasible for all authors to master the entire set of knowledge categories applicable to the author's documents. Similarly, a person searching for a document likewise needs assistance in determining appropriate categories to search for needed information. For example, an author may presently manually assign controlled search terms, such as thesaurus terms, as key words. Further, a searcher may use a partial string match to identify a list of thesaurus terms as search terms.

Currently, attempts to get authors to assign knowledge categories (that is, content metadata) to documents are not very successful. This is because authors are not inclined to assign such knowledge categories unless such an assignment is easily done. Further, authors cannot be expected to know all categories that are important for the author's documents. If authors were to search for appropriate categories, it is likely that categories found would be limited to categories for which the author was searching but was using inexact terms. Even then, searches using standard string matching would often fail to find the categories sought by the authors.

A hand-built thesaurus of synonyms would be helpful. However, creating such a thesaurus of synonyms would be labor-intensive. Moreover, such a thesaurus would still only help authors find known categories. Menus would allow authors to find additional categories. However, this approach would be limited to very small sets of categories. Someone other than an author searching for a document would be motivated more than an author to construct a search query. Again, those searchers would similarly find it difficult to locate the correct categories.

While there are many aspects to managing corporate knowledge, one key issue is how to organize corporate documents into categories of interest. Traditionally, this step requires a great deal of manual intervention and is very time consuming. There are tools that attempt to automatically process raw text data that potentially contains corporate knowledge. However, these tools generate either linguistically-oriented templates, such as subject, action, and object, or field values for a template-like output, such as a resume that contains an applicant's name, education, address, or the like. While these tools could be useful, they still fall short in organizing documents into categories that are meaningful to a corporate environment and that make the knowledge in them directly and easily accessible to others.

Thus, there is an unmet need in the art for an interactive knowledge management environment that organizes knowledge and that allows the organized knowledge to be searched for documents.

SUMMARY OF THE INVENTION

The present invention is an interactive method and system for managing knowledge, such as documents, using text classification. According to the invention, a text classifier automatically suggests knowledge categories, such as keywords, for a user to select when organizing the documents, that is publishing documents to a knowledge management system, such as a document management system. The text classifier also automatically locates search terms that are most relevant to a user's query when searching the organized document management system.

According to one aspect of the present invention, a method and system are provided for determining metadata to be assigned to a document. A document is identified to be published to a collection of documents. A category for publishing the document to the collection is automatically recommended using a text classifier. At least one category for the document may be selected, and the selected category is assigned as metadata for the document. Otherwise, the knowledge categories metadata is left blank.

According to another aspect of the invention, a method and system are provided for constructing a search for a document in a collection of documents. A search query is entered for a document in a collection of documents. A search category for searching for the document in the collection of documents is automatically recommended using a text classifier. At least one search category for searching for the document may be selected.

According to a further aspect of this search embodiment of the present invention, if it is desired to perform a search with the search query that is constructed as described above, a search query is submitted with the selected at least one search category.

BRIEF DESCRIPTION OF THE DRAWINGS

The preferred and alternative embodiments of the present invention are described in detail below with reference to the following drawings.

DETAILED DESCRIPTION OF THE INVENTION

The present invention is an interactive method and system for managing knowledge, such as documents, using text classification. According to the invention, a text classifier automatically suggests knowledge categories, such as keywords, for a user to select when organizing the documents, that is publishing documents to a knowledge management system, such as a document management system. The text classifier also automatically locates search terms that are most relevant to a user's query when searching the organized document management system.

Routines will first be described for training a text classifier, publishing a document to a collection of documents (that is, organizing knowledge) and searching the organized document collection. Next, an embodiment will be described that implements the routines for publishing documents and formulating a search query for documents. Finally, an exemplary host embodiment will be described.

Text Classifier Training Routine

Figure 1:
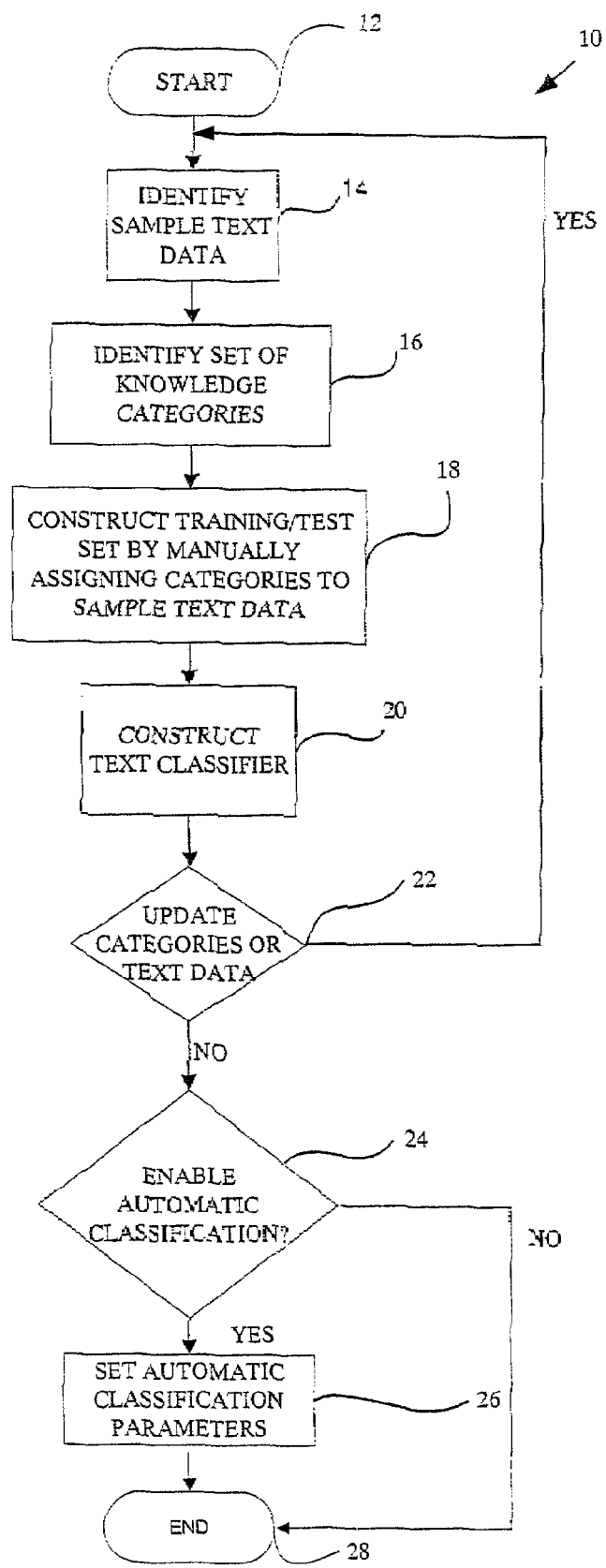
FIG. 1 is a flow chart of a routine for training a text classifier.

FIG. 1 shows a routine 10 for training a text classifier. As is known, text classification (also known as text categorization) assumes the existence of knowledge categories—pre-defined or known classes of knowledge, or concepts, that are germane to an application. These knowledge categories may be manually defined or generated through other methods, and may be optionally edited and refined by a person. Knowledge categories may be expressed in a controlled vocabulary. Constructing a text classifier, that is training a text classifier, assumes the existence of a set of sample documents that have already been assigned knowledge categories. In general, a text classifier is constructed, or trained, by determining how the features of the text of a document can be used to identify the categories that are assigned to the document based on sample documents.

The routine 10 starts at a block 12. At a block 14, sample text data is identified. This step may be performed by, for example, an administrator of a document collection. At the block 14, samples of text are identified that already may have knowledge categories, such as keywords, assigned to them. If the knowledge categories are appropriate for a particular application or for an organization, the fall text of the sample document or an abstract of the document may be identified as sample text to train the classifier for these knowledge categories.

At a block 16, if knowledge categories have not already been assigned to the samples of text, then a set of knowledge categories are identified. This step is suitably performed by a librarian familiar with knowledge categories germane to the organization or an application. The set of knowledge categories is a controlled vocabulary. The knowledge categories may be pre-existing, manually constructed, automatically generated, or a combination thereof. It will be appreciated that, in some cases, some knowledge categories may not have any clear relationship to each other. It will also be appreciated that, in other cases, some knowledge categories may form a concept hierarchy or taxonomy. Such a hierarchy or taxonomy may include a strict hierarchy, a directed graph (possibly not completely connected), or a simple list.

Given by way of non-limiting examples, knowledge categories may be obtained as follows. Knowledge categories can be controlled search terms, that is a controlled list of keywords, that are sanctioned by an organization such as, for example, a library system, a publisher, or a special interest group, such as the Association for Computing Machinery (ACM) or the Institute of Electrical and Electronic Engineers (IEEE). Alternately, knowledge categories can also be defined nationally or internationally by organizations. For example, Air Transport Association systems are an internationally used set of well-defined airplane systems and subsystems that are used to describe commercial airplanes. Similar systems are used to describe military aircraft. It will be appreciated that knowledge categories are applicable to any industry, service, profession, or undertaking without any limitations whatsoever.

While the block 14 is shown preceding the block 16 in FIG. 1, it will be appreciated that in another embodiment the block 16 may be performed before the block 14 is performed. In yet another embodiment, the blocks 14 and 16 may be performed simultaneously.

At a block 18, a training/test set is constructed. The training/test set is constructed by manually assigning knowledge categories, identified at the block 16, to sample text data, identified at the block 14. The block 18 is suitably performed by a librarian or other person familiar with the knowledge categories germane to the organization or an application.

At a block 20, a text classifier is constructed in any suitable manner that is known in the art. The text classifier is constructed based on the knowledge categories identified at the block 16 and the sample text data identified at the block 14. In constructing the text classifier, training parameters are determined. For example, a Naïve Bayes classifier typically includes as a training parameter a threshold of probability that a document belongs to a category.

Text classifiers are well known in the art. Several text classifiers may suitably be used as the text classifier in this invention. For example, suitable text classifiers include the Naïve Bayes classifier, Classification and Regression Trees (CART), or Text Representation Using Subspace Transformation (TRUST). These text classifiers are well known in the art and a detailed discussion of their operation is not necessary for an understanding of the invention. Instead, a discussion of common functionality among text classifiers is sufficient for an understanding of this invention. To that end, in general a text classifier looks at features of text, such as words or phrases. The text classifier determines a function or rule for assigning a category or class to a piece of text based on features of the text, such as words or phrases. Such rules or functions include determining a probability that a document belongs to a category.

At a decision block 22, a determination is made by a person with sufficient knowledge of the categories, such as a document administrator, whether updates are desired to the sample text data identified at the block 14 or the knowledge categories identified at the block 16. Updates are desirable to add new categories, or when original sample text is not fully representative of text desired to be categorized, or the like. If a determination is made that such updates are desired, the routine 10 returns to the block 14. If a determination is made that such updates are not desired, the routine 10 continues toward a decision block 24.

At the decision block 24, a determination is made whether automatic classification is enabled. As will be discussed further below, when a document is submitted and reviewed by the text classifier, a knowledge category or categories may be automatically classified for the document. If a determination is made at the decision block 24 that automatic classification will be enabled, the routine 10 proceeds to a block 26. At the block 26, parameters regarding automatic classification are set. For example, threshold probabilities may be set at a higher level to accommodate automatic classification. The block 26 is suitably performed by a document collection administrator. It will be appreciated that the blocks 24 and 26 may be performed at any time, such as before the blocks 14 and 16.

The routine 10 ends at a block 28. When a determination is made at the decision block 24 that automatic classification will not be enabled, the routine 10 proceeds to the block 28 and ends.

Figure 2B:
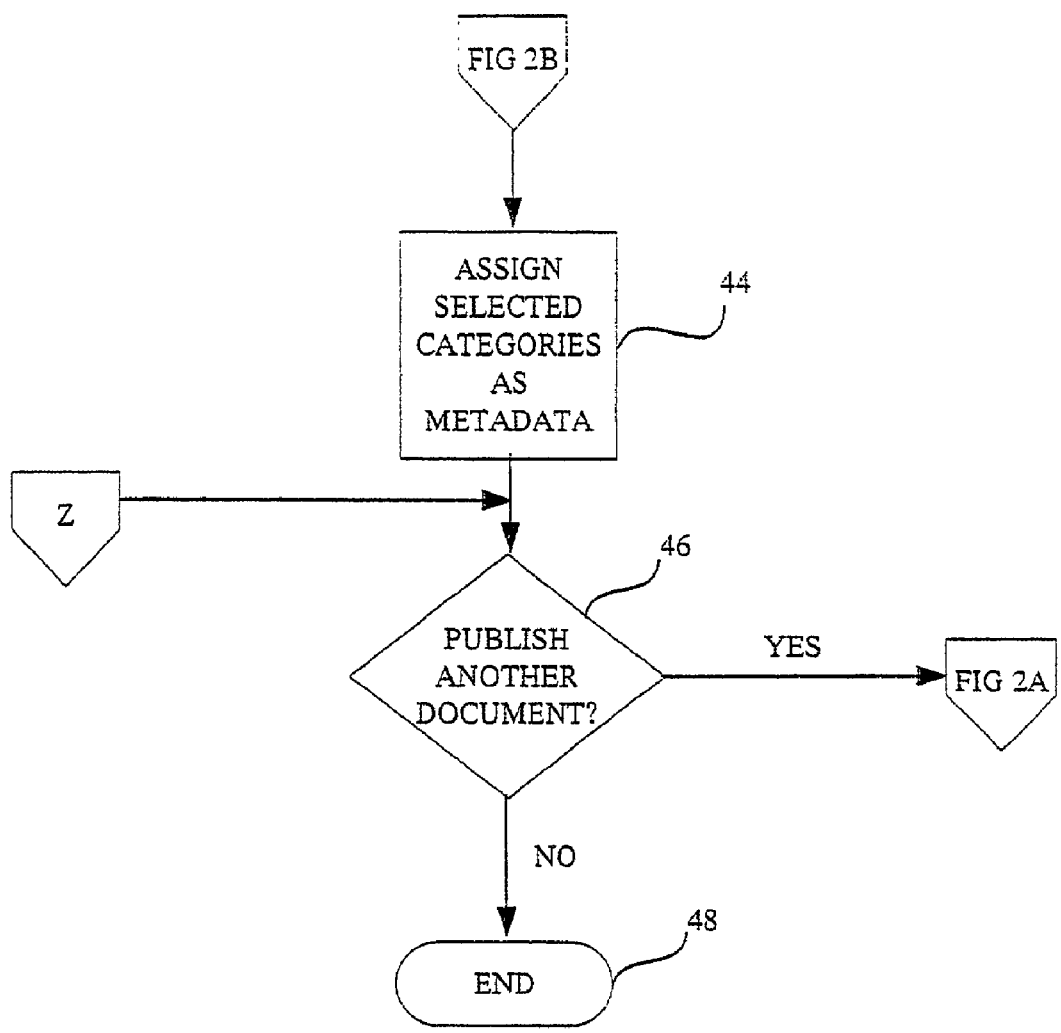
FIG. 2 is a flow chart of a routine for publishing a document to a document collection.

FIG. 2 shows a routine 30 for publishing a document to a collection of documents, that is organizing the document collection or, more generally, organizing knowledge. The routine 30 uses the text classifier constructed, or trained, by the routine 10 to classify new documents, that is new data or knowledge, that have not been previously classified or categorized, or when new categories have been added to a taxonomy.

The routine 30 begins at a block 32. At a block 34, a document to be added to the collection of documents is submitted by an author or person having responsibility for the document. It will be appreciated that documents in the collection, as well as documents that are submitted at the block 34, are in the form of electronic documents, including without limitation reports, e-mail messages, memorandums, notes, and the like. In addition, it will be appreciated that a document can also include a web page that is identified by a uniform resource locator (URL). It will also be appreciated that the document collection can be suitably implemented on a network, or an intranet, or an extranet, or the Internet. Thus, at the block 34, the document is suitably submitted by an author or any other person having responsibility for the document by any acceptable method, such as, without limitation, reading the document from disc, transmitting the document via electronic mail, uploading the document via a network, downloading a document via a suitable protocol such as file transfer protocol, exporting the document from an application, or the like.

At a block 36, the text classifier that was trained during the routine 10 analyzes the document and recommends a knowledge category for the document. The text classifier reads the text of the document and associates or assigns the text of the document to the knowledge categories on which the text classifier was trained. It will be appreciated that association or assignment performed by the text classifier may vary depending upon the type of text classifier used. For example, the association or assignment between the text of the document and knowledge categories may be probabilistic. An example of a text classifier that uses a probabilistic association or assignment is a Naïve Bayes text classifier. Because text classifiers are well known in the art, a detailed description of their operation is not necessary for an understanding of the invention.

At a decision block 38, a determination is made by the submitter of the document whether the knowledge category recommended by the text classifier will be selected or whether the submitter of the document desires to add a knowledge category that has not been recommended by the text classifier. If a determination is made at the decision block 38 that neither a recommended knowledge category will be selected nor a category that has not been recommended by the text classifier will be added, then the routine 30 proceeds to a decision block 40.

At the decision block 40, a determination is automatically made whether automatic classification has been enabled at the block 26 (FIG. 1). If a determination is made at the decision block 40 that automatic classification is enabled, the routine 30 proceeds to a block 42. At the block 42, knowledge categories are automatically selected that fit parameters established at the block 26 (FIG. 1). In one embodiment of the invention, the text classifier assigns to each document probabilities that the document belongs to knowledge categories recommended by the text classifier at the block 36. At the block 42, categories that have a probability above a predetermined threshold value are automatically selected as knowledge categories for the document.

At a block 44, the knowledge categories selected, either automatically or by the user, are automatically assigned as metadata for the document. Assigning the knowledge categories as metadata for the document permits the knowledge categories to be used for subsequent searches for knowledge, that is text, contained within the document.

The routine 30 proceeds to a decision block 46 at which a determination is made whether it is desired to publish another document to the collection of documents. If it is desired to publish another document to the collection of documents, then the routine 30 returns to the block 34. If a determination is made to publish no more documents to the collection of documents, the routine 30 proceeds to a block 48 and ends.

If at the decision block 38 a determination is made to either select a knowledge category recommended by the text classifier at the block 36 or to add a knowledge category that was not recommended by the text classifier at the block 36, then the routine 30 proceeds to a decision block 50. At the decision block 50, a determination is made whether or not to select a knowledge category that has been recommended by the text classifier at the block 36. If a determination is made to select a knowledge category recommended by the text classifier, then the routine 30 proceeds to a decision block 52. At the decision block 52, a determination is made whether or not to add the recommended knowledge category to the list of knowledge categories applicable to the document collection. If at the decision block 52, a determination is made to add the knowledge category that has been selected to the list of knowledge categories applicable to the document, then at a block 54 the selected knowledge category is added to the list of knowledge categories applicable to the document. The routine 30 then returns to the decision block 50.

If a determination is made at the decision block 52 to not add the selected knowledge category to the list of knowledge categories applicable to the documents, then the routine 30 proceeds to a decision block 56. At the decision block 56, a determination is made whether or not to expand any of the recommended knowledge categories to related knowledge categories. A related knowledge category is a knowledge category that bears a relationship to another knowledge category. For example, the relationship may exist within a hierarchy or taxonomy of categories. As a further example, the relationship may be a rule-based relationship. That is, a predetermination is made that one knowledge category bears a relationship to another knowledge category by virtue of common authors, common technology, common applications, common uses or domains, or the like. Knowledge categories may also be related stochastically. That is, when the text classifier has previously recommended one of the knowledge categories, the related knowledge category has also been recommended by the text classifier in excess of a minimum, predetermined number of times or, alternatively, in excess of a predetermined percentage of times. If a determination is made to expand any of the knowledge categories, then at a block 58 related knowledge categories are automatically determined based on the taxonomy or hierarchy or relationships among the knowledge categories, and are presented to the user for selection as knowledge categories that are applicable to the document. The routine 30 then returns to the decision block 50.

If at the decision block 56 a determination is made to not expand any of the recommended knowledge categories, then the routine 30 proceeds to a decision block 60. At the decision block 60, a determination is made whether or not to return to a prior list, if any, of knowledge categories that have been presented to the user for selection as knowledge categories that are applicable to the document. If a determination is made to return to a prior list of knowledge categories, then at a block 62 a prior list of knowledge categories applicable to the document is selected and the routine 30 returns to the decision block 50. If a determination is made at the decision block 60 to not return to a prior list of knowledge categories applicable to the document, then the routine 30 returns to the decision block 50.

If a determination is made at the decision block 50 to not select a recommended knowledge category, then the routine 30 proceeds to a decision block 64. At the decision block 64, a determination is made whether or not to add to the list of knowledge categories applicable to the document any knowledge categories that are not recommended by the text classifier. If a determination is made to add a knowledge category that was not recommended by the text classifier, then at a block 66 knowledge categories that are not recommended by the text classifier are added to the list of knowledge categories that are applicable to the document, and the routine 30 returns to the decision block 50.

If at the decision block 64 a determination is made to not add any knowledge categories that are not recommended by the text classifier to the list of knowledge categories applicable to the document, then the routine 30 proceeds to a decision block 65. At the decision block 65, a determination is made whether or not to remove any knowledge categories that have been selected as being applicable to the document. If a determination is made to remove any knowledge categories, then at a block 67 the undesired knowledge categories are removed. If it is not desired to remove any knowledge categories, then the routine 30 proceeds to a decision block 68. At the decision block 68, a determination is made whether or not any knowledge categories have been selected as being applicable to the document. If any knowledge categories have been selected as being applicable to the document, then the routine 30 proceeds to the block 44, and the selected knowledge categories are assigned to the document as metadata. If no categories have been selected as being applicable to the document, then routine 30 proceeds to the decision block 46, and a determination is made whether or not it is desired to publish another document to the collection of documents.

With the document collection thus organized with knowledge categories, according to the invention search queries may be constructed for searching the organized document collection.

Search Query Routine

Figure 3:
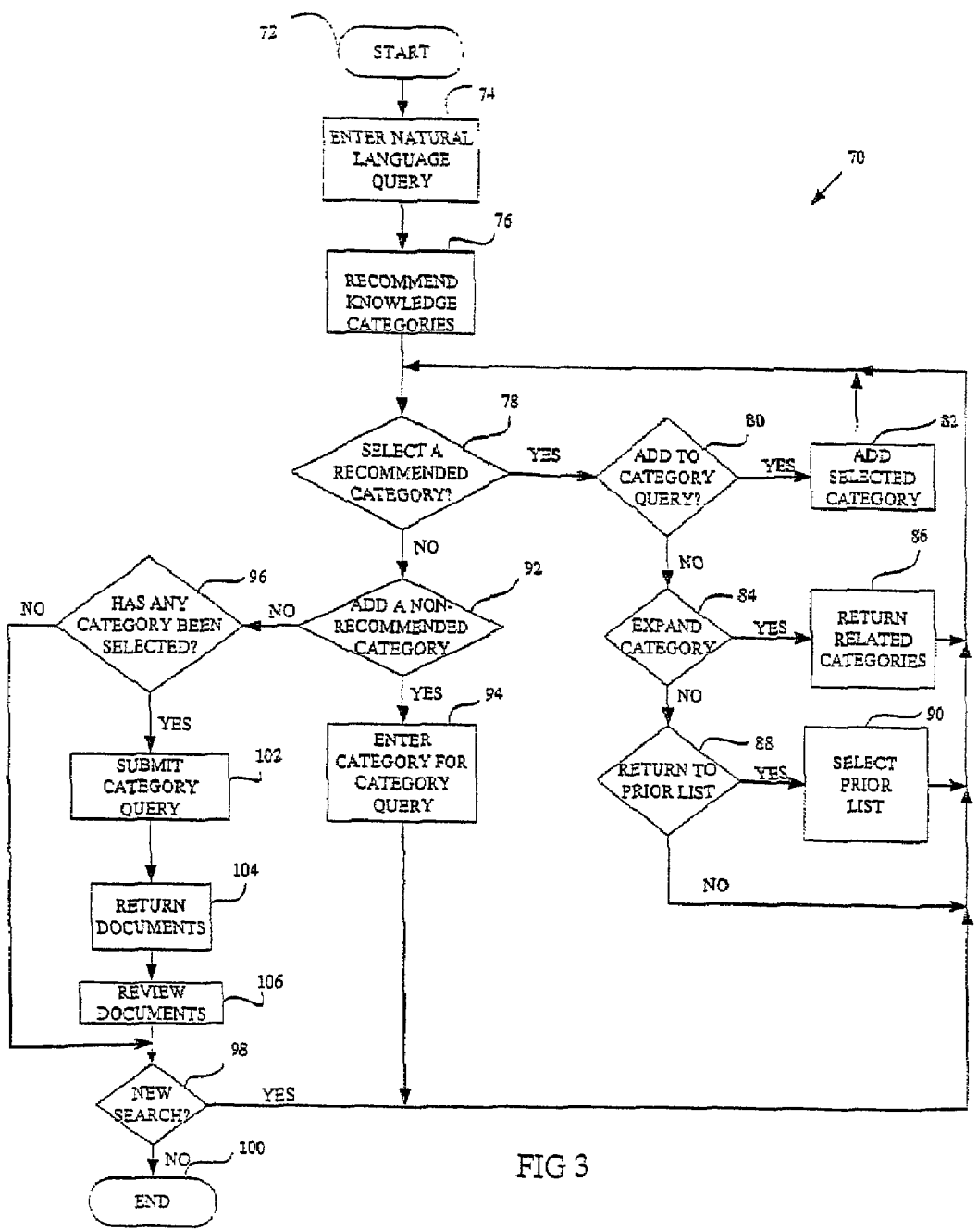
FIG. 3 is a flow chart of a routine for formulating a search query for a document collection.

FIG. 3 shows a routine 70 for constructing a search query. Because, as discussed above, it is not feasible to expect authors to memorize all the controlled vocabulary of the knowledge categories applicable to the author's documents, it is likewise not feasible to expect a person searching the document collection for documents to similarly have memorized the controlled vocabulary of all the knowledge categories applicable to documents containing information or text data for which the searcher is interested. Therefore, if a search engine requires that a searcher enter knowledge categories, such as keywords, that are recognized by the search engine and which are known to the searcher, then such a search protocol will likely yield few results. According to the invention, though, the text classifier recommends a set of knowledge categories for a category query, that is a search query using knowledge categories, based on a natural language search query submitted by the user. The searcher can then select one or more of the knowledge categories recommended by the text classifier to construct a category query.

The routine 70 begins at a block 72. At a block 74, a searcher, that is a person who wants to find a document in the document collection that was organized according to the routine 30, enters a search query. In one embodiment of the invention, the search query is a natural language query.

At a block 76, the text classifier, constructed during the routine 10, analyzes the query submitted by the user and recommends a knowledge category for a category query for documents in the document collection. The text classifier reads the search query that was entered, associates or assigns the entered query to the knowledge categories on which the text classifier was trained, and returns any recommended knowledge categories. It will be appreciated that the text classifier suitably performs the association or assignment and recommendation at the block 76 in the same manner in which the text classifier performs the association or assignment and recommendation at the block 36 (FIG. 2).

At a decision block 78 a determination is made by the searcher whether or not to select a knowledge category recommended by the text classifier at the block 76. If a determination is made to select a knowledge category recommended by the text classifier, then the routine 70 proceeds to a decision block 80. At the decision block 80, a determination is made by the searcher whether or not to add the recommended knowledge category to a category query. That is, the searcher determines if it is desired to construct a category query using knowledge categories that are recommended by the text classifier. If at the decision block 80 a determination is made to add a knowledge category recommended by the text classifier to the category query, then at a block 82 the selected knowledge category is added to the category query. The routine 70 then returns to the decision block 78.

If a determination is made at the decision block 80 to not add the selected knowledge category to the category query, then the routine 70 proceeds to a decision block 84. At the decision block 84, the searcher makes a determination whether or not to expand any of the recommended knowledge categories to related knowledge categories. If a determination is made to expand the knowledge categories, then at a block 86 related knowledge categories are automatically determined and are added to the list of knowledge categories that are available for the category query. Expansion to related knowledge categories is suitably performed in the same manner as the expansion to related knowledge categories performed at the block 58 (FIG. 2). The routine 70 then returns to the decision block 78.

If at the decision block 84 a determination is made to not expand the knowledge categories, then the routine 70 proceeds to a decision block 88. At the decision block 88, a determination is made whether or not to return to a prior list, if any, of knowledge categories that have been presented to the user for selection as knowledge categories that are applicable to the category query. If a determination is made to return to a prior list of knowledge categories, then at block 90 the searcher selects a prior list of knowledge categories that are applicable to the category query, and the routine 70 returns to the decision block 78. Selecting the prior list of knowledge categories is suitably performed at the block 90 in the same manner as selecting a prior list of knowledge categories applicable to a document performed at the block 62 (FIG. 2). If a determination is made to not return to a prior list of knowledge categories, then the routine 70 returns to the decision block 78.

If at the decision block 78 a determination is made to not select a recommended knowledge category for the category query, then the routine 70 proceeds to a decision block 92. At the decision block 92, the searcher makes a determination whether or not to add a knowledge category that is not recommended by the text classifier at the block 76 to the list of knowledge categories available for the category query. If a determination is made to add a knowledge category that is not recommended by the text classifier, then at a block 94 the searcher enters knowledge categories not recommended by the text classifier to the list of knowledge categories available for a category query, and the routine 70 returns to the decision block 78.

If at the decision block 92 a determination is made to not add a knowledge category not recommended by the text classifier, then the routine 70 proceeds to a decision block 96. At the decision block 96 a determination is made whether any knowledge category has been selected for the category query. If no knowledge category has been selected, then the routine 70 proceeds to a decision block 98. At the decision block 98 a determination is made whether or not to construct another category query. If a determination is made to construct another category query, then the routine 70 returns to the block 74. If a determination is made to not construct another category query, then the routine 70 ends at a block 100.

If at the decision block 96 a determination is made that at least one knowledge category has been selected for the category query, then at a block 102 the category query is submitted and in a known manner a search engine automatically analyzes the category query and searches the document collection for documents that have been assigned any of the categories in the category query as metadata. Search engines are well known in the art, and any acceptable search engine may be used to perform the search at the block 104. Results from the search performed at the block 102 are returned at the block 104 and include documents from the document collection identified by the search engine. At a block 106 the searcher reviews the documents returned at the block 104. The routine 70 then proceeds to the decision block 98 where the searcher makes a determination whether or not to construct another category query.

Exemplary Embodiment of Implementation

Figure 12:
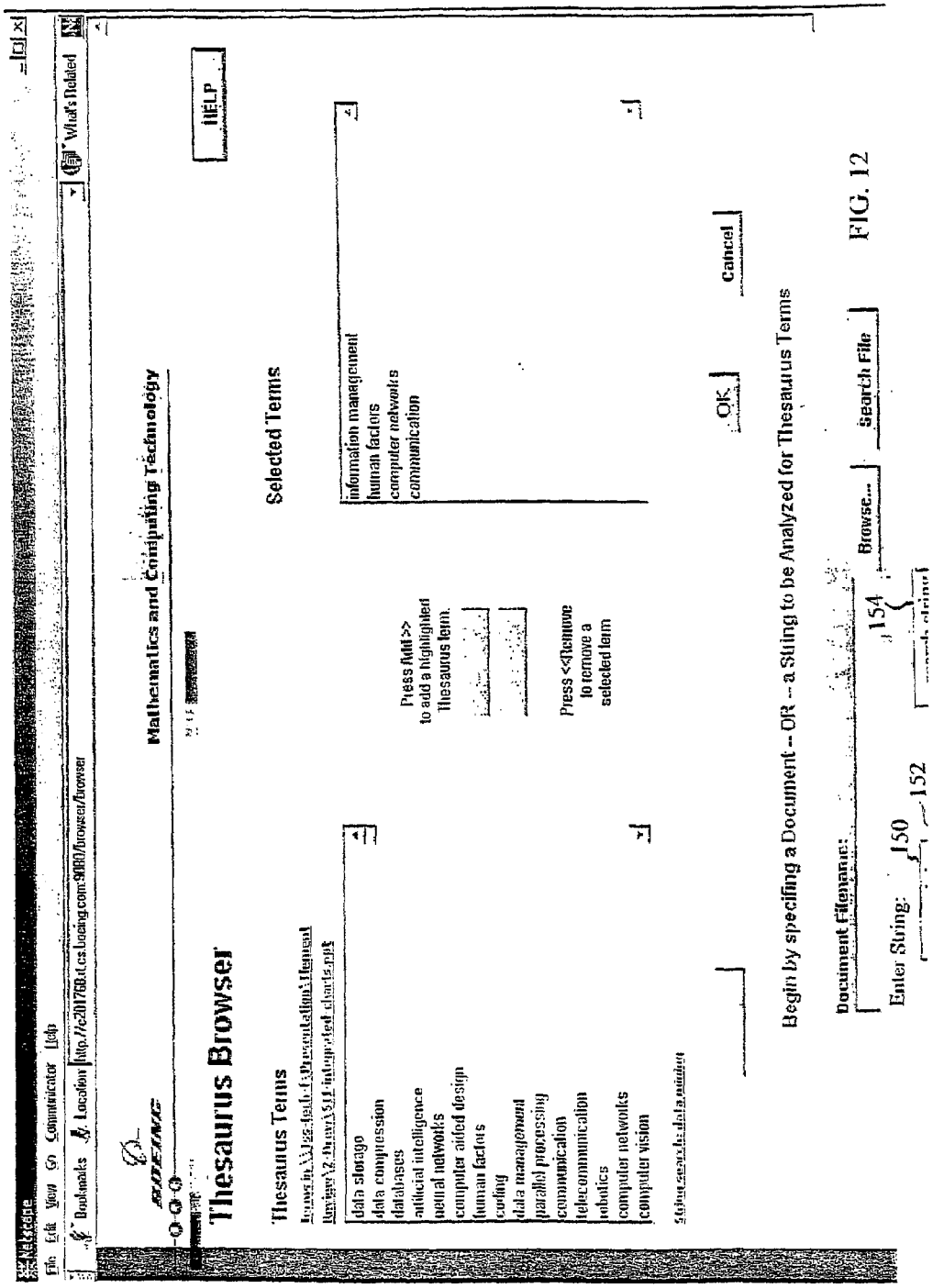
Figure 13:
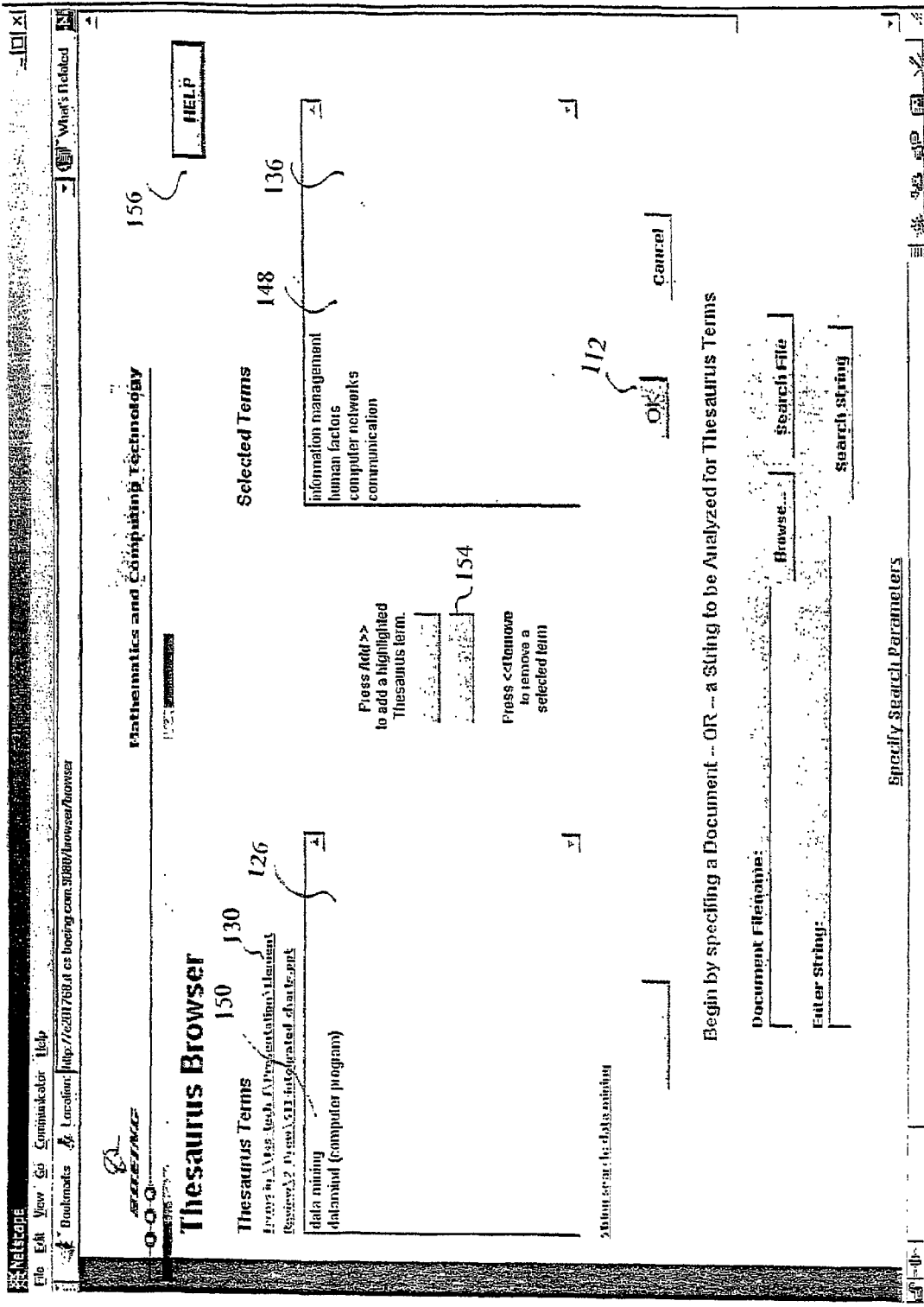
Figure 14:
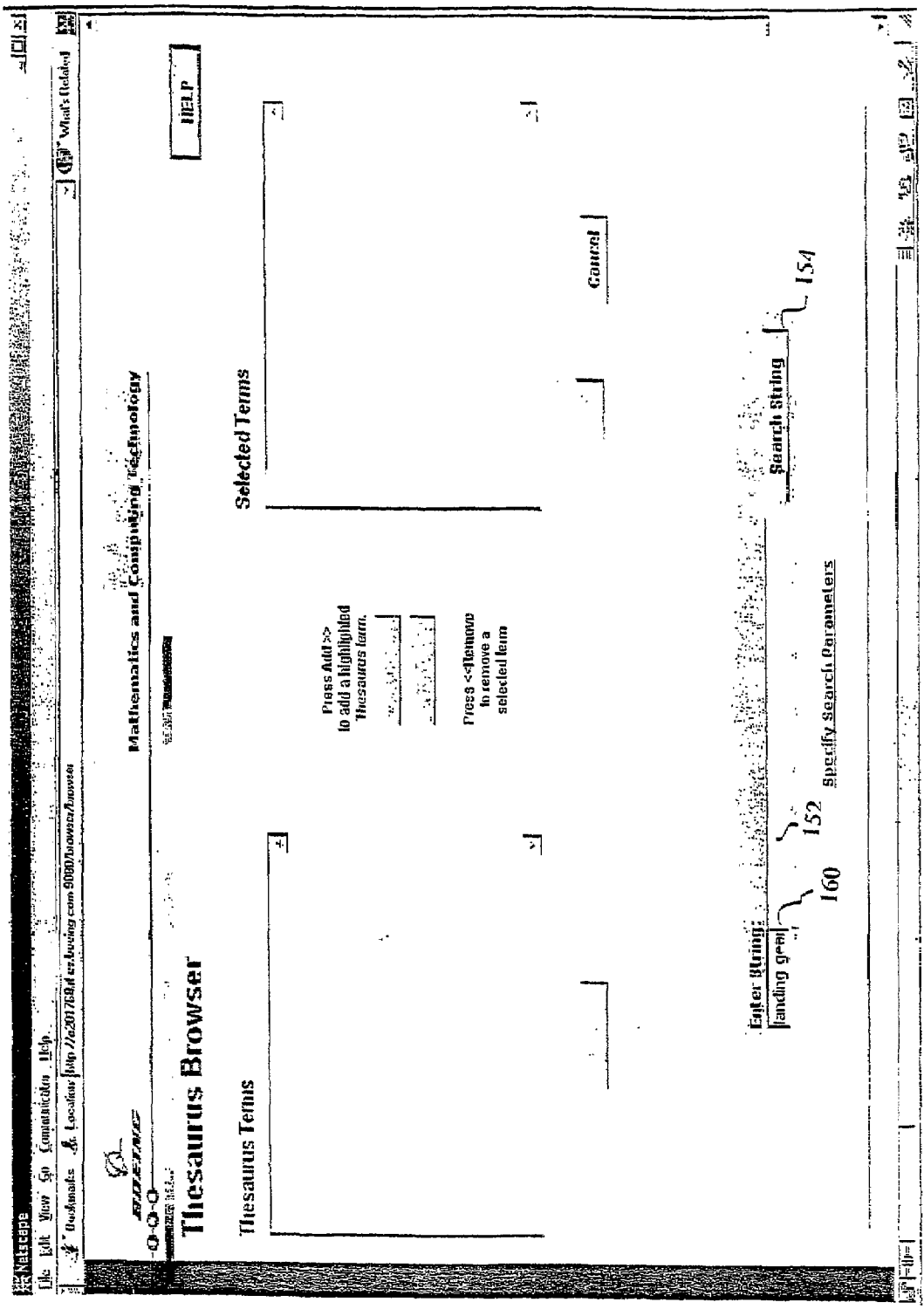
FIGS. 14 and 15 are screen shots of exemplary embodiment implementing the routine for formatting a search query for a document collection.
Figure 15:
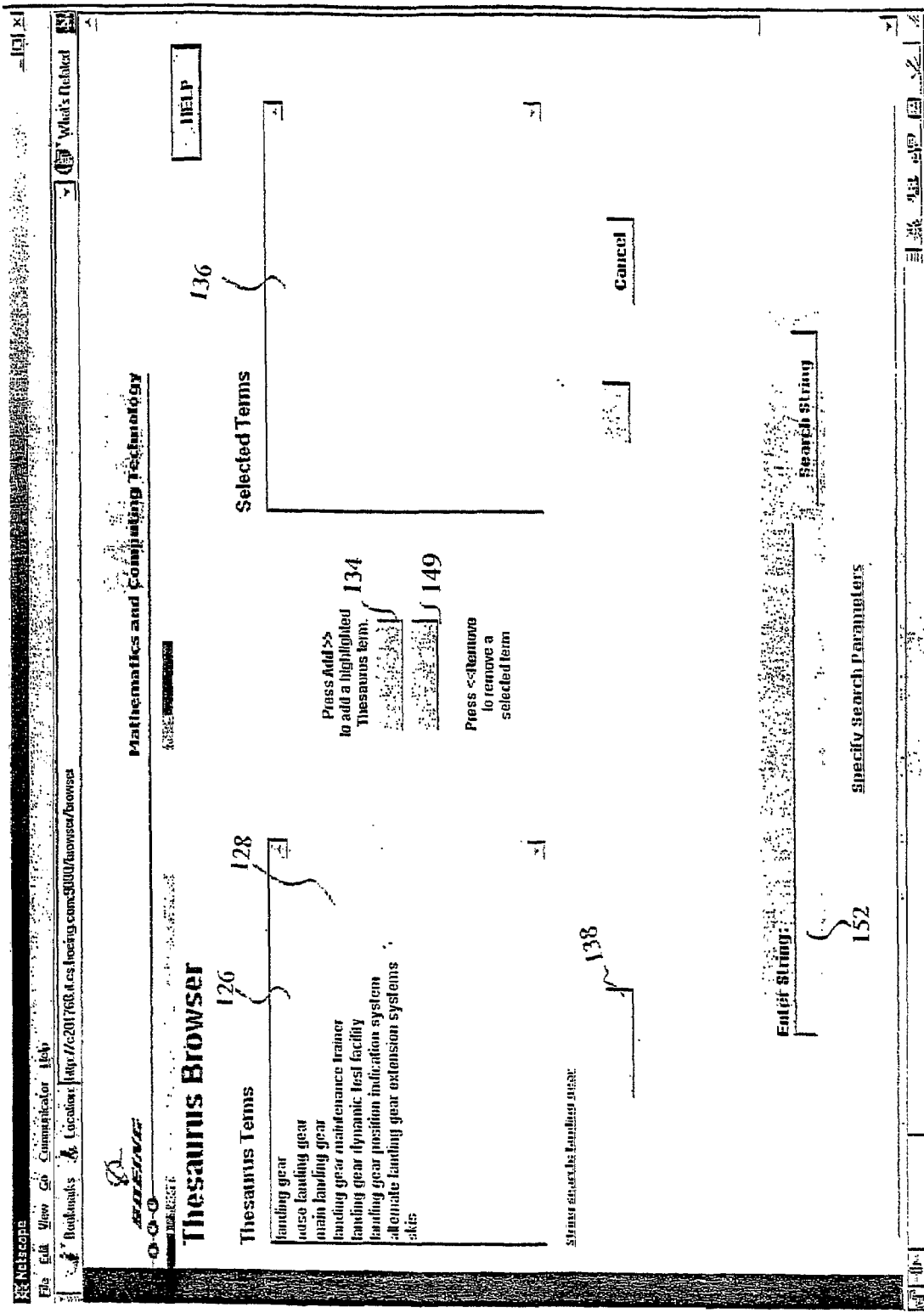

FIGS. 4-13 show screen shots of an exemplary embodiment of an implementation of the routine 30 (FIG. 2) for publishing a document to a document collection, and FIGS. 14-15 show screen shots of an exemplary embodiment of an implementation of the routine 70 (FIG. 3) for constructing a category query for documents in the document collection organized by the routine 30 (FIG. 2).

Figure 4:
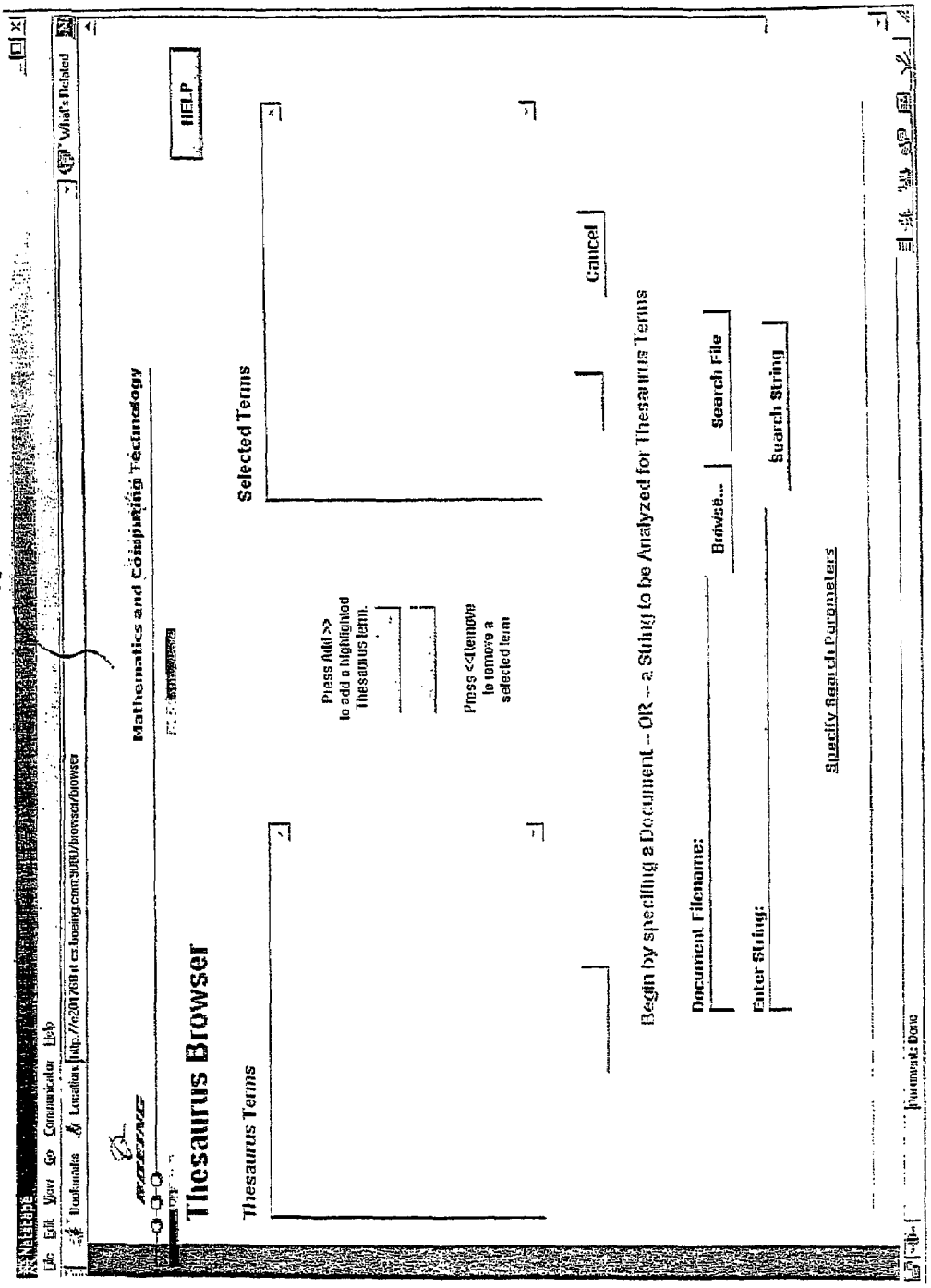
FIGS. 4-13 are screen shots of an exemplary embodiment implementing the routine for publishing a document to a document collection.
Figure 5:
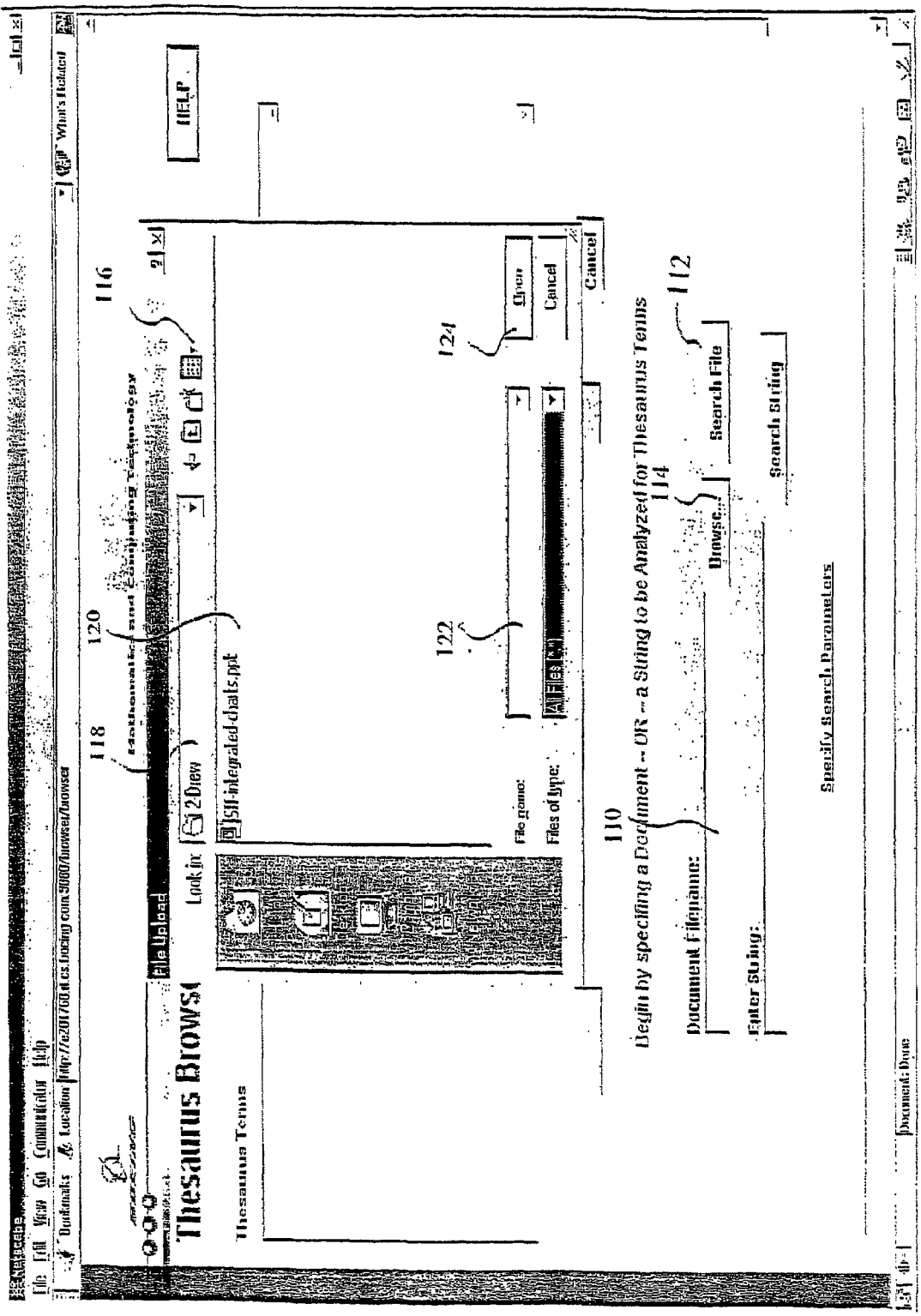

FIG. 4 shows an initial screen 108 of an exemplary implementation of the routine 30 (FIG. 2) for publishing a document to a collection of documents. Referring now to FIG. 5, an author or person having responsibility for a document can submit a document for recommendation of knowledge categories by entering a file name for the document in a field 110 and then clicking on a Search file button 112. Alternately, an author may submit a document by clicking on a browse button 114. When the browse button 114 is activated, a file upload window 116 is presented. Locations, such as drives, directories, or folders, that are accessible for browsing are shown in a "Look in" box 118, and file names of documents available at the location indicated in the box 118 appear in a box 120. Clicking on the name of the document in the box 120 causes the file name to appear in a file name box 122.

When a file name appears in the box 122 and an open button 124 is clicked, the text classifier analyzes the document and recommends knowledge categories that are applicable to the document. Alternately, when a document name is entered in the box 110 and the Search file button 112 is clicked, the text classifier analyzes the document whose document name appears in the box 110 and recommends knowledge categories for the document.

Figure 6:
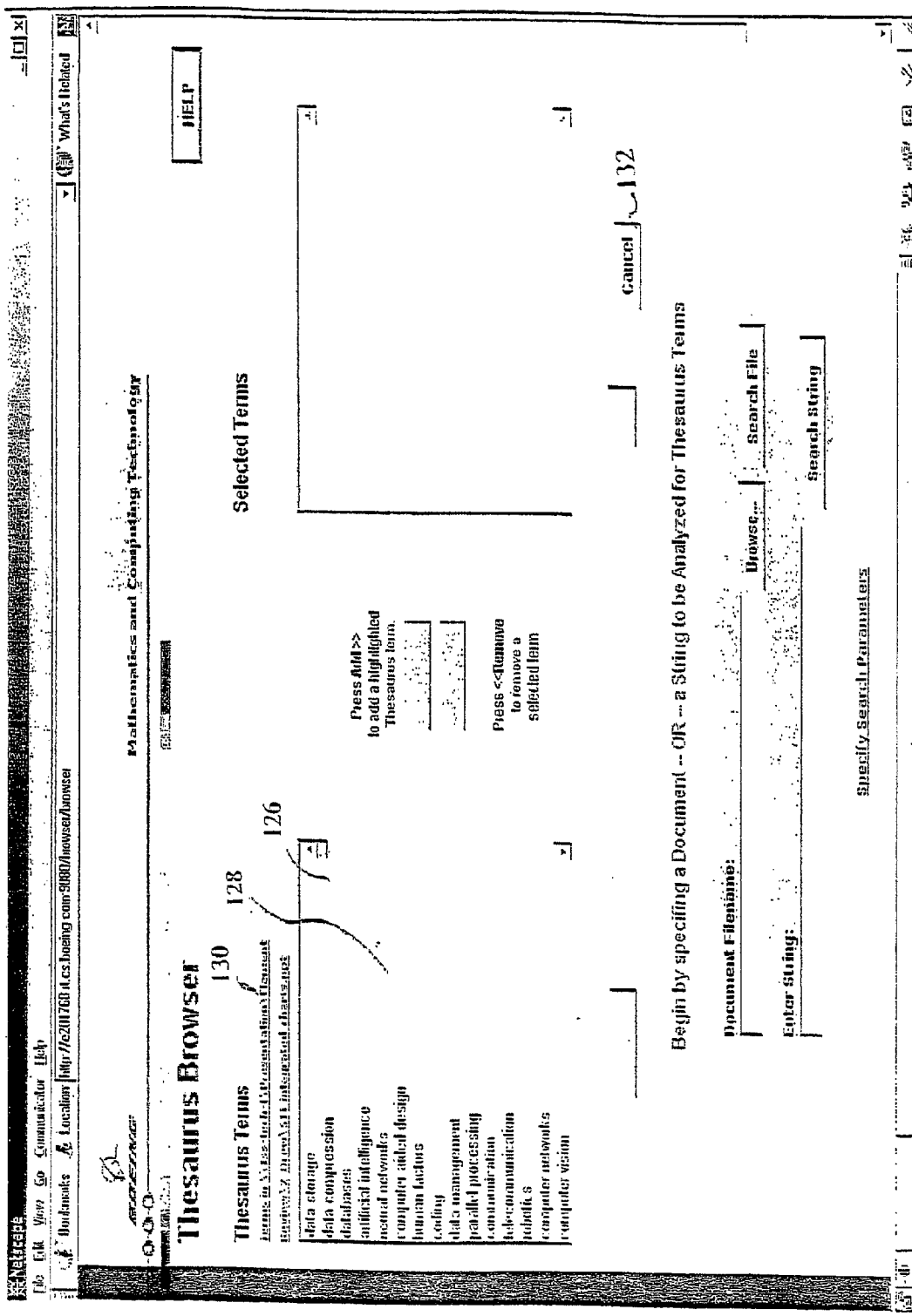

Referring now to FIG. 6, a thesaurus terms box 126 includes a plurality of knowledge categories 128 recommended by the text classifier. In the non-limiting example shown in FIG. 6, the knowledge categories 128 have been recommended by the text classifier for the submitted document entitled "SII-integrated-charts.ppt" (FIG. 5). A navigation bar 130 shows a path for the document submitted. The navigation bar 130 also shows a navigation history of knowledge categories.

If the author does not desire to select one of the recommended knowledge categories 128 or add a non-recommended category, or add a category obtained by expanding a category, then the author clicks on a cancel button 132. If automatic classification has been enabled, then knowledge categories are automatically selected as described for the block 42 (FIG. 2) and the selected knowledge categories are assigned as metadata as described for the block 44 (FIG. 2). If automatic classification has not been enabled, then the initial screen 108 is presented and the author may publish another document to the document collection, if desired.

Figure 7:
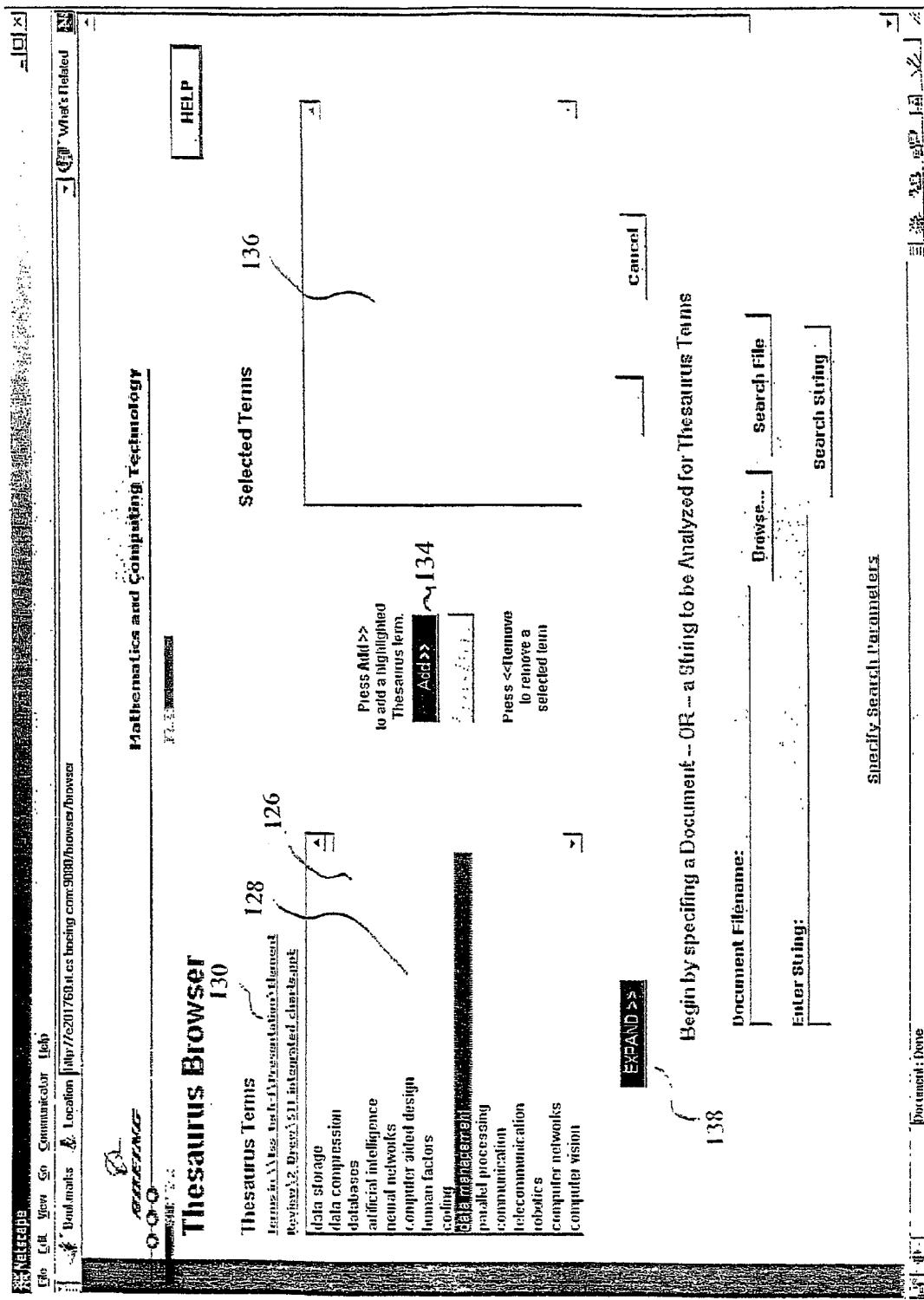

Referring now to FIG. 7, to select one of the recommended knowledge categories 128, the author clicks on the desired knowledge category in the thesaurus terms box 126. In this non-limiting example, the knowledge category "data management" has been selected. To add the selected knowledge category that is highlighted in the thesaurus terms box 126, the author clicks on an "add" button 134, and the highlighted term appears in a selected terms box 136.

Figure 8:
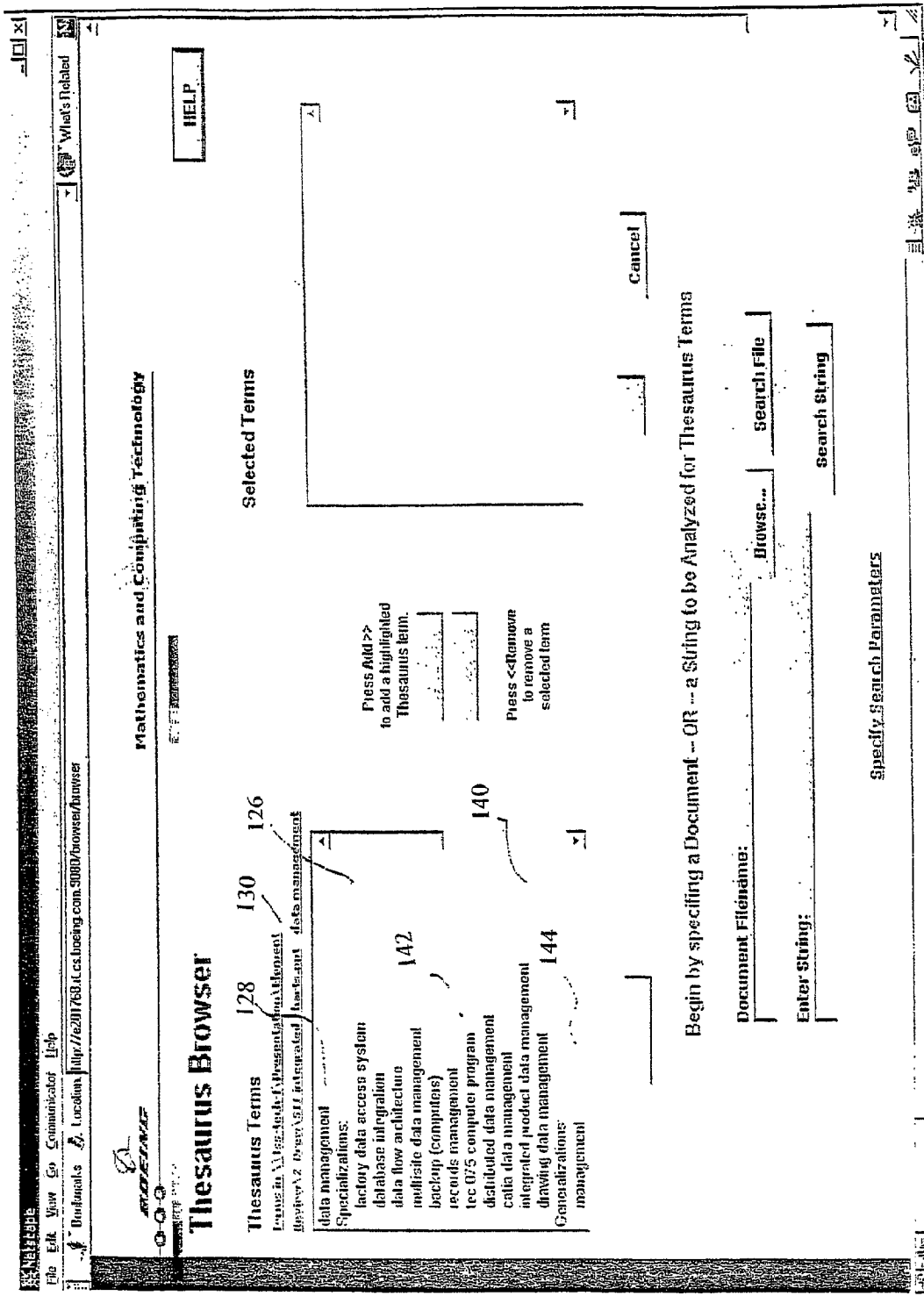

If the author desires to expand the highlighted knowledge category to related knowledge categories, then the author clicks on an expand button 138. Referring now to FIG. 8, related knowledge categories 140 appear in the thesaurus terms box 126. In one embodiment of the invention, the related knowledge categories 140 include specialized related knowledge categories 142 that relate to selected knowledge categories according to specialization relationships or a specific hierarchy. The related knowledge categories 140 may also include generalized related knowledge categories 144 that relate to the selected knowledge category according to generalization relationships or a specific hierarchy. When a highlighted knowledge category 128 is expanded to related knowledge categories 140, the highlighted term appears in the navigation bar 130.

Figure 9:
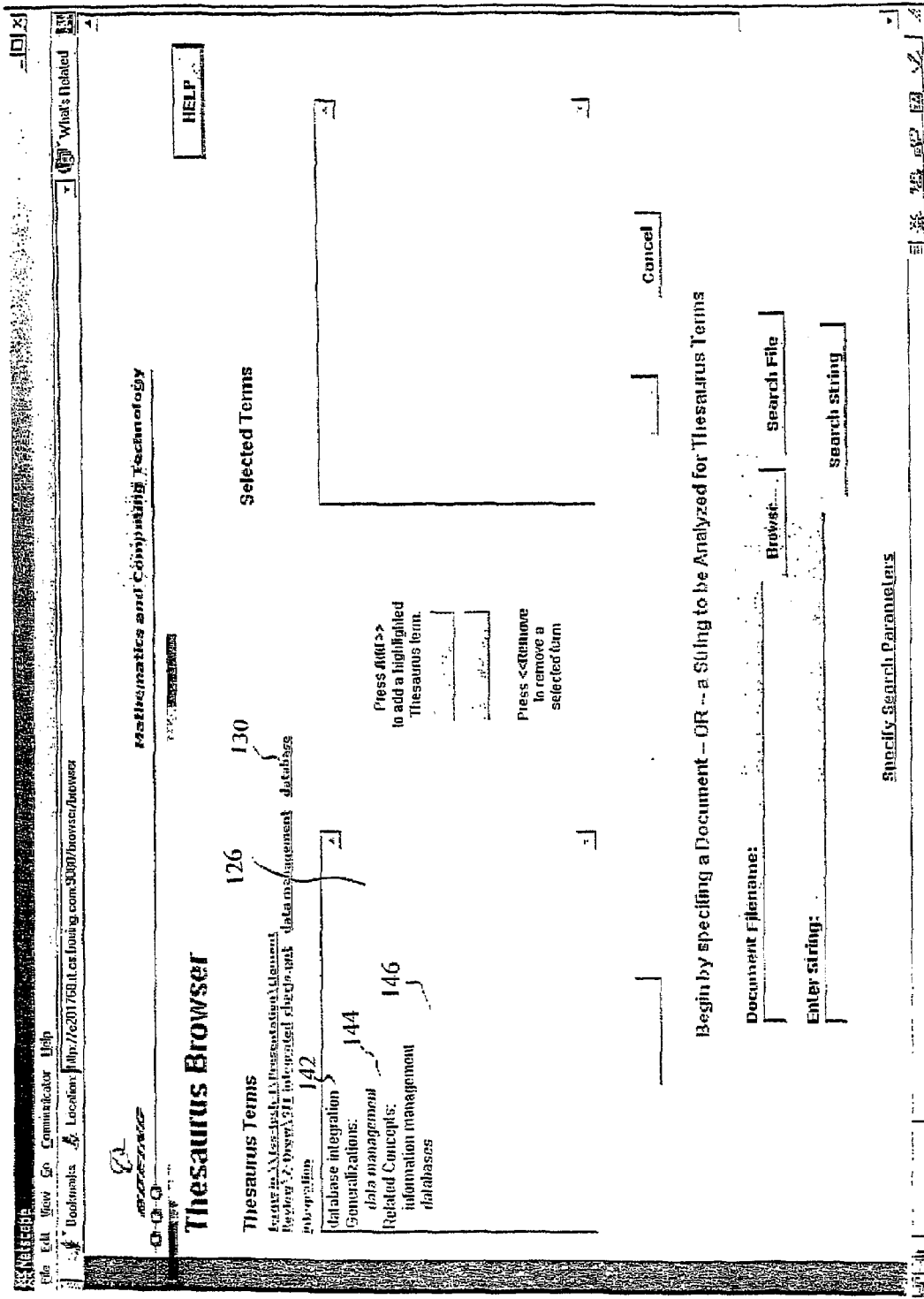

Referring now to FIG. 9, the related knowledge category "database integration" has been highlighted and expanded. The knowledge category 142 of "database integration" now appears in the navigation bar 130. The generalized related knowledge category 144 of "data management" is the knowledge category 128 that is one level up from "database integration" in the hierarchical relationship between "data management" and "database integration." The thesaurus terms box 126 now includes related concepts 146. Related concepts are knowledge categories that bear a relationship to a specialized related knowledge category 144 other than being the generalized related knowledge category that is one step up in the hierarchical taxonomy or other than being another of the specialized related knowledge categories 142.

Figure 10:
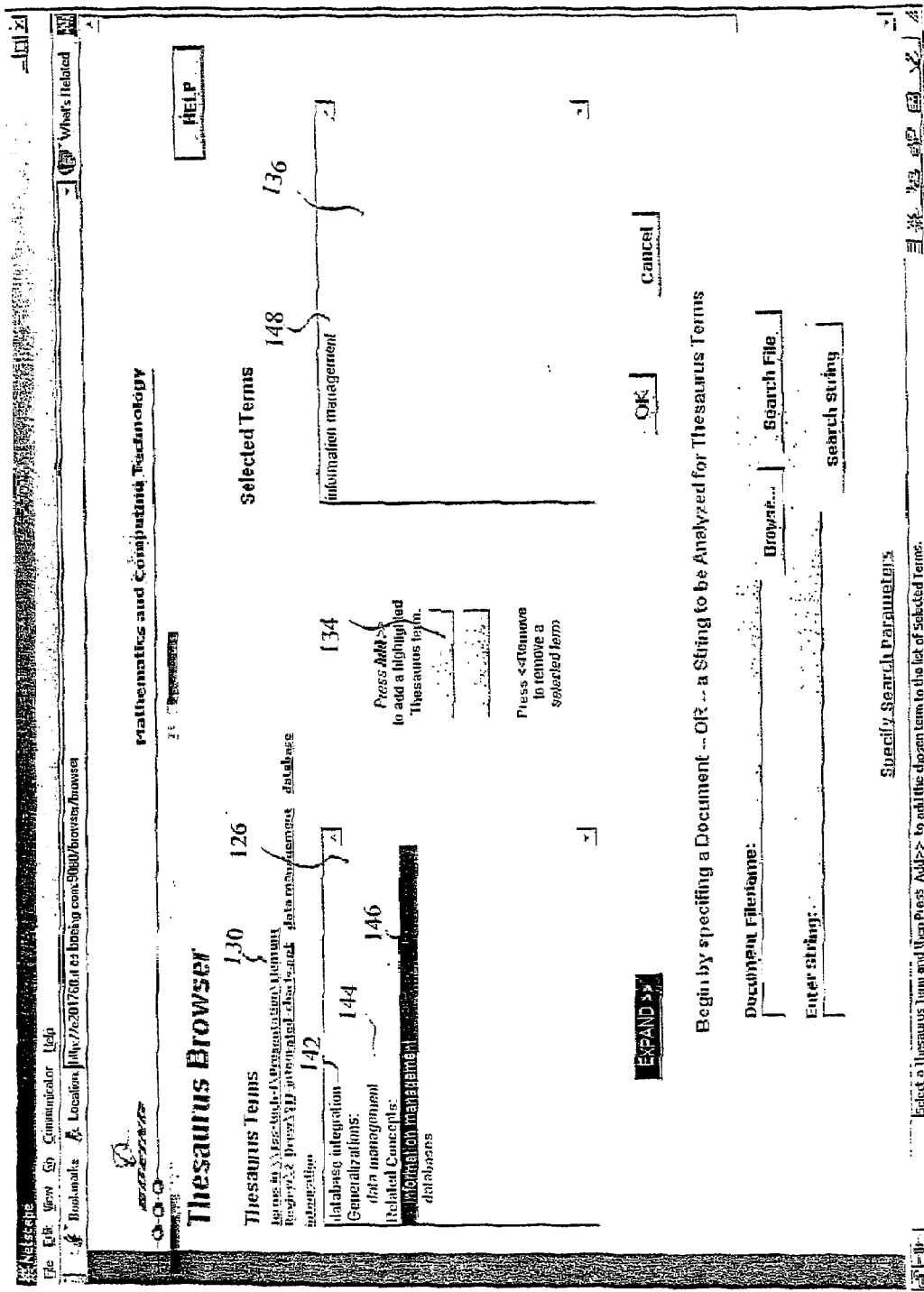

Referring now to FIG. 10, the related concept 146 of "information management" is highlighted. The add button 134 is clicked, and "information management" appears in the selected terms box 136 as a selected knowledge category 148 that is applicable to the document "SII-integrated-charts.ppt."

Figure 11:
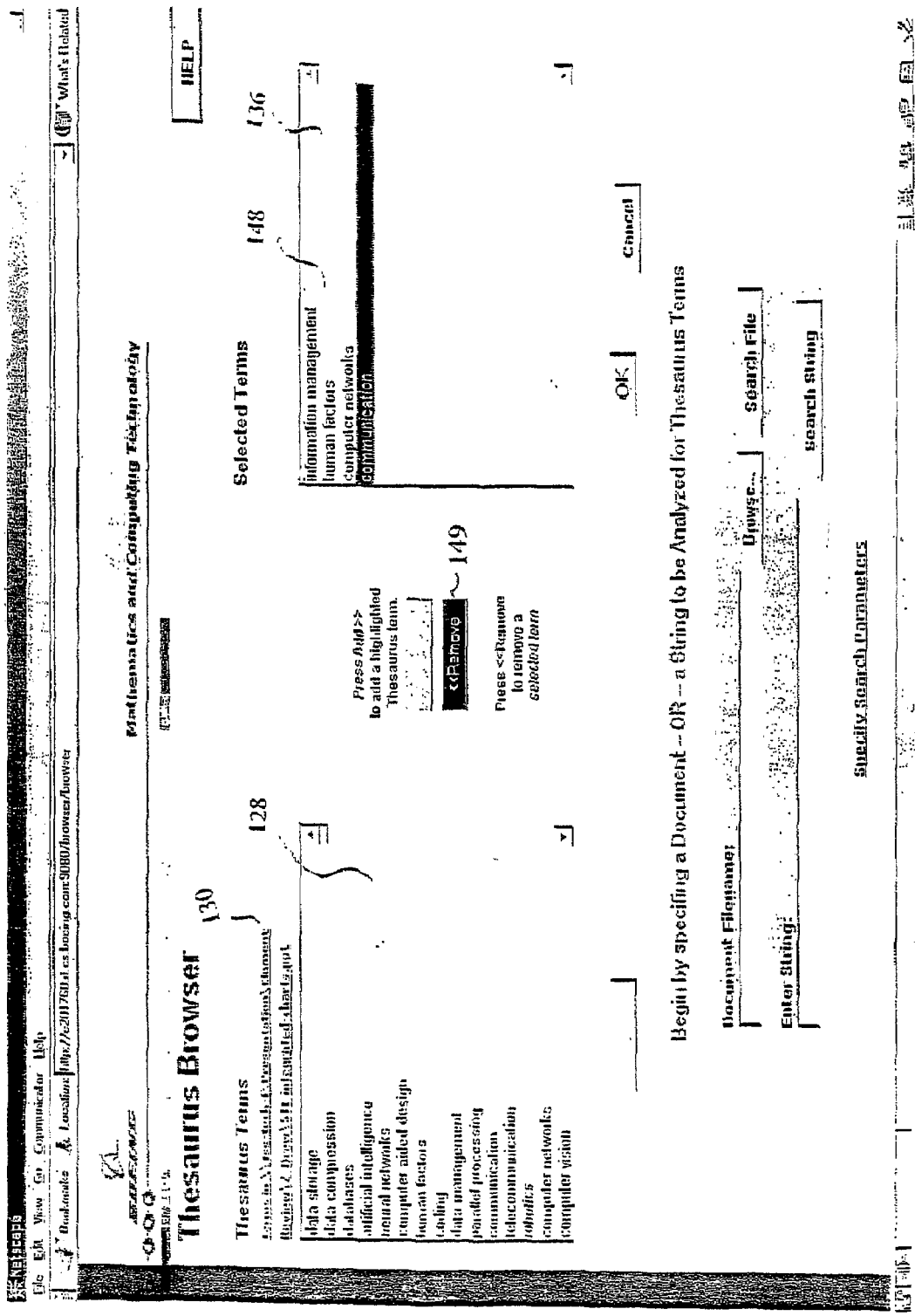

Referring now to FIG. 11, the author has clicked on "SII-integrated-charts.ppt" in the navigation bar 130 to return to and select the prior list of knowledge categories 128 recommended by the text classifier for that document (see FIG. 6). For example, the knowledge categories 128 of "human factors," "computer networks," and "communications" have been highlighted, and the add button 134 has been clicked. Those knowledge categories now appear in the selected terms box 136 as selected knowledge categories 148 that are applicable to the document "SII-integrated-charts.ppt." If desired, any of the selected knowledge categories 148 may be removed from the selected terms box 136 at any time. To remove a selected knowledge category 148, the author highlights the selected knowledge category 148 and clicks on a remove button 149.

Referring now to FIG. 12, a non-recommended knowledge category 150 of "data mining" has been entered into a box 152, and a search string button 154 is clicked. Referring now to FIG. 13, the non-recommended knowledge category 150 of "data mining" appears in the thesaurus terms box 126. It will be appreciated that the term "datamind" is also returned because "datamind" satisfies a partial string match. If desired, the non-recommended knowledge categories 150 may be added to the selected terms box 136 as selected knowledge categories 148 that are applicable to the document indicated in the navigation bar 130 (in this case, "SII-integrated-charts.ppt).

When at least one selected knowledge category 148 is shown in the selected terms box, the selected knowledge categories 148 are assigned as metadata to the document shown in the navigation bar 130 when the OK button 112 is clicked. If the author requests help, interactive help is available by clicking on a help button 156 at any time.

FIG. 14 shows an initial screen 158 of an exemplary implementation of the routine 70 (FIG. 3) for constructing a category query. A searcher begins constructing a search query by entering a query 160 in the box 152. In the non-limiting example shown in FIG. 14, a natural language query—in this case, "landing gear"—is used. After the query 160 is entered in the box 152, the button 154 is clicked to submit the query and the text classifier recommends knowledge categories for constructing a category query (see block 76, FIG. 3).

Referring now to FIG. 15, recommended knowledge categories 128 for the category query appear in the thesaurus terms box 126. Knowledge categories for the category query are selected by highlighting the desired knowledge category and clicking the add button 134. The knowledge categories selected for the category query appear in the selected terms box 136. The recommended knowledge categories are expanded to related knowledge categories by clicking on the expand button 138. If desired, selected knowledge categories may be removed from the selected terms box 136 by highlighting the undesired knowledge category, in this case "communication," and clicking the remove button 149.

The category query includes the selected knowledge categories in the selected terms box 136. The searcher submits the category query by clicking the OK button 112. Search results are returned in any acceptable manner.

Exemplary Host Embodiment

FIGS. 1-15 are flowchart and screen shot illustrations of methods and computer program products according to the invention. It will be understood that each block or step of the flowchart and screen shot illustrations, and combinations of blocks in the flowchart and screen shot illustrations, can be implemented by computer program instructions or other means, such as operator interaction. Although computer program instructions are discussed herein below, for example, an apparatus according to the present invention can include other means, such as hardware or some combination of hardware and software, including one or more processors or controllers for performing the text classification, publishing a document to a document collection, or forming a knowledge category query.

Figure 16:
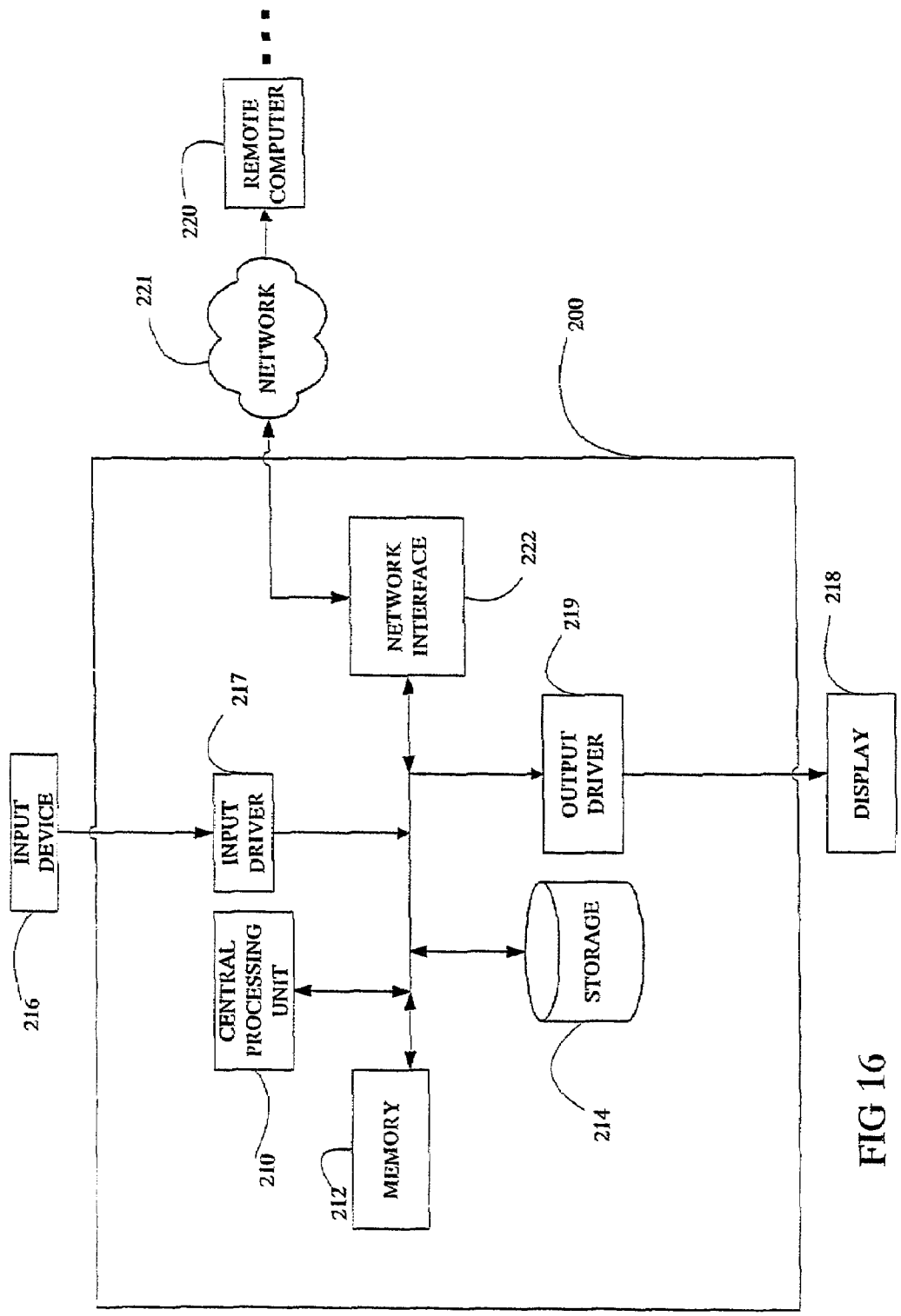
FIG. 16 is a block diagram of an exemplary host embodiment of the invention.

In this regard, FIG. 16 depicts the apparatus of one exemplary host embodiment including several of the key components of a general purpose computer 200 on which the present invention may be implemented. Those of ordinary skill in the art will appreciate that a computer includes many more components than those shown in FIG. 16. However, it is not necessary that all of these generally conventional components be shown in order to disclose an illustrative embodiment for practicing the invention. The computer 200 includes a processing unit 210 and a memory 212, which suitably includes random access memory (RAM) and read-only memory (ROM) of any acceptable variant. The computer 200 also includes storage 214, such as a hard disk drive, where data, such as documents and text, and applications may be stored. The apparatus of the present invention can also include one or more input devices 216, such as a mouse, keyboard, etc, that are connected to an input driver 217 that is included in the computer 200. A display 218 is provided for viewing text classification and document data, and interacting with a user interface to request text classification, document publishing, and search query operations. The display 218 is connected to an output driver 219 that is included in the computer 200. The apparatus of the present invention may be connected to one or more remote computers 220 through a network 221 via a network interface 222. The network 221 suitably includes a local area network (LAN), a wide are network (WAN), an intranet, an extranet, or the Internet. As is known, the network interface 222 includes all of the necessary circuitry for such a connection to the network 221. In one embodiment of the present invention, the document collection includes documents available on the remote computer(s) 220 and accessible via the network 221. It will be appreciated that other embodiments are possible, including: a local document collection, that is, all documents are stored on the computer 200; documents stored on a server and/or a client in a network environment; and the like.

Typically, computer program instructions may be loaded onto the computer or other programmable apparatus to produce a machine, such that the instructions which execute on the computer or other programmable apparatus create means for implementing the functions specified in the flowcharts or screen shot block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart or screen shot block(s) or step(s). The computer program instructions may also be loaded onto the computer or other programmable apparatus to cause a series of operational steps to be performed on the computer or other programmable apparatus to produce a computer implemented process such that the instructions which execute on the computer or other programmable apparatus provide steps for implementing the functions specified in the flowchart or screen shot block(s) or step(s).

Accordingly, blocks or steps of the flowchart or screen shot illustrations support combinations of means for performing the specified functions and program instruction means for performing the specified functions. It will also be understood that each block or step of the flowchart or screen shot illustrations, and combinations of blocks or steps in the flowchart or screen shot illustrations, can be implemented by special purpose hardware-based computer systems which perform the specified functions or steps, or combinations of special purpose hardware and computer instructions.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A computer executable method for determining metadata to be assigned to a document, the method comprising:
    identifying a document to be published to a collection of documents organized according to a predetermined taxonomy sanctioned by an organization independent of an entity that controls the collection of documents and that includes a stored plurality of predetermined knowledge categories;
    applying a trained text classifier to the identified document;
    outputting from the trained text classifier at least one of the plurality of predetermined knowledge categories;
    without parsing the document into predicate structures, automatically presenting to a user the at least one of the plurality of predetermined knowledge categories that is output by the trained text classifier as at least one recommended knowledge category for the user to select to publish the document to the collection of documents;
    receiving, from the user, a selection of at least one knowledge category for the document;
    expanding a knowledge category to at least one related knowledge category, wherein the at least one related knowledge category is within a hierarchy in the predetermined taxonomy of categories including the at least one recommended knowledge category;
    receiving, from the user, a selection of at least one related knowledge category for the document; and
    assigning the at least one selected knowledge category and the at least one related knowledge category as metadata for publishing the document to the collection of documents.

2. The method of claim 1, wherein automatically presenting at least one recommended knowledge category further includes:
    reading text of the document;
    retrieving the stored plurality of predetermined knowledge categories;
    associating the text of the document with the plurality of predetermined knowledge categories; and
    recommending at least one of the predetermined plurality of knowledge categories as the at least one recommended knowledge category when, association of the text of the document with the at least one recommended knowledge category exceeds a predetermined threshold.

3. The method of claim 2, wherein the text of the document is associated with the at least one recommended knowledge category when a numerical value for the association exceeds a predetermined probability that the at least one recommended knowledge category applies to the document.

4. The method of claim 2, wherein the text of the document is associated with the at least one recommended knowledge category when the text of the document includes the at least one recommended knowledge category.

5. The method of claim 1, wherein the trained text classifier is a Naive Bayes text classifier.

6. The method of claim 1, wherein the at least one knowledge category selected by the user for the document includes the at least one recommended knowledge category recommended by the trained text classifier.

7. The method of claim 1, wherein the at least one knowledge category selected by the user for the document does not include the at least one recommended knowledge category recommended by the trained text classifier.

8. The method of claim 1, wherein the predetermined knowledge categories include at least one controlled list of keywords selected by an industry specific group.

9. The method of claim 8, wherein the at least one controlled list of keywords includes keywords selected by a professional organization.

10. The method of claim 1, further comprising expanding a particular knowledge category of the at least one recommended knowledge category output by the trained text classifier to at least one stochastically related knowledge category, wherein the at least one stochastically related knowledge category is not related to the particular knowledge category by the predetermined taxonomy but has previously been recommended with the particular knowledge category by the trained text classifier.

11. A system for determining metadata to be assigned to a document, the system comprising:
    at least one input interface configured to input a document to be published to a collection of documents organized according to a predetermined taxonomy that includes a stored plurality of predetermined knowledge categories, wherein the plurality of predetermined knowledge categories includes at least one controlled list of keywords;
    a user interface configured to permit a user to select at least one knowledge category for the document as a selected knowledge category; and
    a processor including:
        a first component configured to apply a trained text classifier to the inputted document and to output from the trained text classifier at least one of the plurality of predetermined knowledge categories as a recommended knowledge category;
        a second component configured to automatically present to a user the recommended knowledge category and at least one related knowledge category including at least one of a specialized related knowledge category and a generalized related knowledge category within a hierarchy of categories within the predetermined taxonomy including the at least one recommended knowledge category, wherein the user is permitted to select at least one of the recommended knowledge category and the at least one related knowledge category; and
        a third component configured to assign the at least one selected knowledge category as metadata for publishing the document to the collection of documents.

12. The system of claim 11, wherein the second component further includes:
    a fourth component configured to read text of the document;

a fifth component configured to retrieve the stored plurality of predetermined knowledge categories;

a sixth component configured to associate the text of the document with the plurality of predetermined knowledge categories; and a seventh component configured to recommend at least one of the predetermined plurality of knowledge categories as the at least one recommended knowledge category when association of the text of the document with the at least one recommended knowledge category exceeds a predetermined threshold.

13. The system of claim 12, wherein the sixth component includes a Naive Bayes text classifier.

14. The system of claim 12, wherein the text of the document is associated with the at least one, recommended knowledge category when a numerical value for the association exceeds a predetermined probability that the at least one recommended knowledge category applies to the document.

15. The system of claim 12, wherein the text of the document is associated with the at least one recommended knowledge category when the text of the document includes the at least one recommended knowledge category.

16. The system of claim 11, wherein the at least one knowledge category selected by the user for the document includes the at least one recommended knowledge category recommended by the trained text classifier.

17. The system of claim 11, wherein the at least one knowledge category selected by the user for the document does not include the at least one recommended knowledge category recommended by the trained text classifier.

18. The system of claim 11, wherein the processor further includes an eighth component configured to expand a knowledge category to at least one related knowledge category.

19. The system of claim 11, wherein the at least one controlled list of keywords includes terms selected by an industry organization.

20. The system of claim 11, wherein the at least one controlled list of keywords includes keywords selected by a professional organization.

21. The system of claim 11, wherein the at least one related knowledge category includes at least one stochastically related knowledge category, wherein the at least one stochastically related knowledge category is not related to the knowledge category by the predetermined taxonomy but has previously been recommended with the knowledge category by the trained text classifier.

22. A computer executable method for determining metadata to be assigned to a document, the method comprising:

identifying a document to be published to a collection of documents organized according to a hierarchical taxonomy, wherein each of a plurality of documents included in the collection of documents is associated with one or more knowledge categories included in the hierarchical taxonomy;

applying a trained text classifier to the identified document, wherein the trained text classifier identifies one or more recommended knowledge categories from the hierarchical taxonomy based on content of the identified document;

presenting the one or more recommended knowledge categories to a user;

enabling the user to expand at least one knowledge category included in the one or more recommended knowledge categories to present one or more hierarchically related knowledge categories included in the hierarchical taxonomy;

enabling the user to make a selection of at least one selected knowledge category for the document from the one or more recommended knowledge categories and the one or more hierarchically related knowledge categories; and assigning the at least one selected knowledge category as metadata in publishing the document to the collection of documents.

23. The computer executable method of claim 22, further comprising automatically assigning the one or more recommended knowledge categories as the metadata in publishing the document to the collection of documents when the user fails to provide the selection of the at least one selected knowledge category.

24. The computer executable method of claim 23, wherein the one or more hierarchically related knowledge categories includes one or more generalized related knowledge categories at a next higher level in the hierarchical taxonomy than the at least one knowledge category.

25. The computer executable method of claim 23, wherein the one or more hierarchically related knowledge categories include one or more specialized related knowledge categories within the at least one knowledge category.

26. The computer executable method of claim 25, further comprising presenting one or more related knowledge categories to the user, wherein the one or more related knowledge categories are related to one of the one or more specialized related knowledge categories within the at least one knowledge category and wherein the one or more related knowledge categories are selectable as the at least one selected knowledge category.

27. The computer executable method of claim 22, further comprising enabling the at least one selected knowledge category to be removed from association with the document.

28. The computer executable method of claim 22, further comprising receiving, from the user, a search string of the hierarchical taxonomy for a non-recommended knowledge category.

29. The computer executable method of claim 28, further comprising receiving, from the user, a selection of the non-recommended knowledge category as the at least one selected knowledge category.

30. The computer executable method of claim 22, wherein the one or more recommended knowledge categories are presented in a first terms box and the at least one selected knowledge category is presented in a second terms box.

31. A computer executable method for determining metadata to be assigned to a document, the method comprising:

identifying a document to be published to a collection of documents organized according to a hierarchical taxonomy, wherein each of a plurality of documents included in the collection of documents is associated with one or more knowledge categories included in the hierarchical taxonomy;

applying a trained text classifier to the identified document, wherein the trained text classifier identifies one or more recommended knowledge categories from the hierarchical taxonomy based on content of the identified document;

presenting the one or more recommended knowledge categories to a user;

enabling the user to expand at least one knowledge category included in the one or more recommended knowledge categories to present one or more related knowledge categories included in the hierarchical taxonomy, wherein the related knowledge categories include:

one or more knowledge categories at a next more general level in the hierarchical taxonomy than the at least one knowledge category; and one or more knowledge categories at a next more specific level in the hierarchical taxonomy than the at least one knowledge category;

enabling the user to make a selection of at least one selected knowledge category for the document from the one or more recommended knowledge categories and the one or more related knowledge categories; and assigning the at least one selected knowledge category as metadata in publishing the document to the collection of documents.

32. The computer executable method of claim 31, further comprising enabling the user to expand the at least one knowledge category included in the recommended knowledge categories to present one or more non-hierarchically related knowledge categories.

33. The computer executable method of claim 32, wherein a relationship between the knowledge category and the one or more non-hierarchically related knowledge categories includes a rule-based relationship.

34. The computer executable method of claim 33, wherein the rule-based relationship relates the at least one knowledge category the one or more non-hierarchically related knowledge categories because the at least one knowledge category and the one or more non-hierarchically related knowledge categories share a common author.

35. The computer executable method of claim 33, wherein the rule-based relationship relates the at least one knowledge category and the one or more non-hierarchically related knowledge categories because the at least one knowledge category and the one or more non-hierarchically related knowledge categories share a common technology.

36. The computer executable method of claim 33, wherein the rule-based relationship relates the at least one knowledge category and the one or more non-hierarchically related knowledge categories because the at least one knowledge category and the one or more non-hierarchically related knowledge categories share a common application.

37. The computer executable method of claim 33, wherein the rule-based relationship relates the at least one knowledge category and the one or more non-hierarchically related knowledge categories because the at least one knowledge category and the one or more non-hierarchically related knowledge categories share a common domain.

38. The computer executable method of claim 31, further comprising automatically assigning the one or more recommended knowledge categories as the metadata in publishing the document to the collection of documents when the user fails to provide the selection of the at least one selected knowledge category.

39. The computer executable method of claim 31, further comprising enabling the at least one selected knowledge category to be removed from association with the document.

40. The computer executable method of claim 31, further comprising receiving, from the user, a search string of the hierarchical taxonomy for a non-recommended knowledge category.

41. The computer executable method of claim 40, further comprising receiving, from the user, a selection of the non-recommended knowledge category as the at least one selected knowledge category.

42. The computer executable method of claim 31, wherein the one or more recommended knowledge categories are presented in a first terms box and the at least one selected knowledge category is presented in a second terms box.

* * * * *